Figure 1:
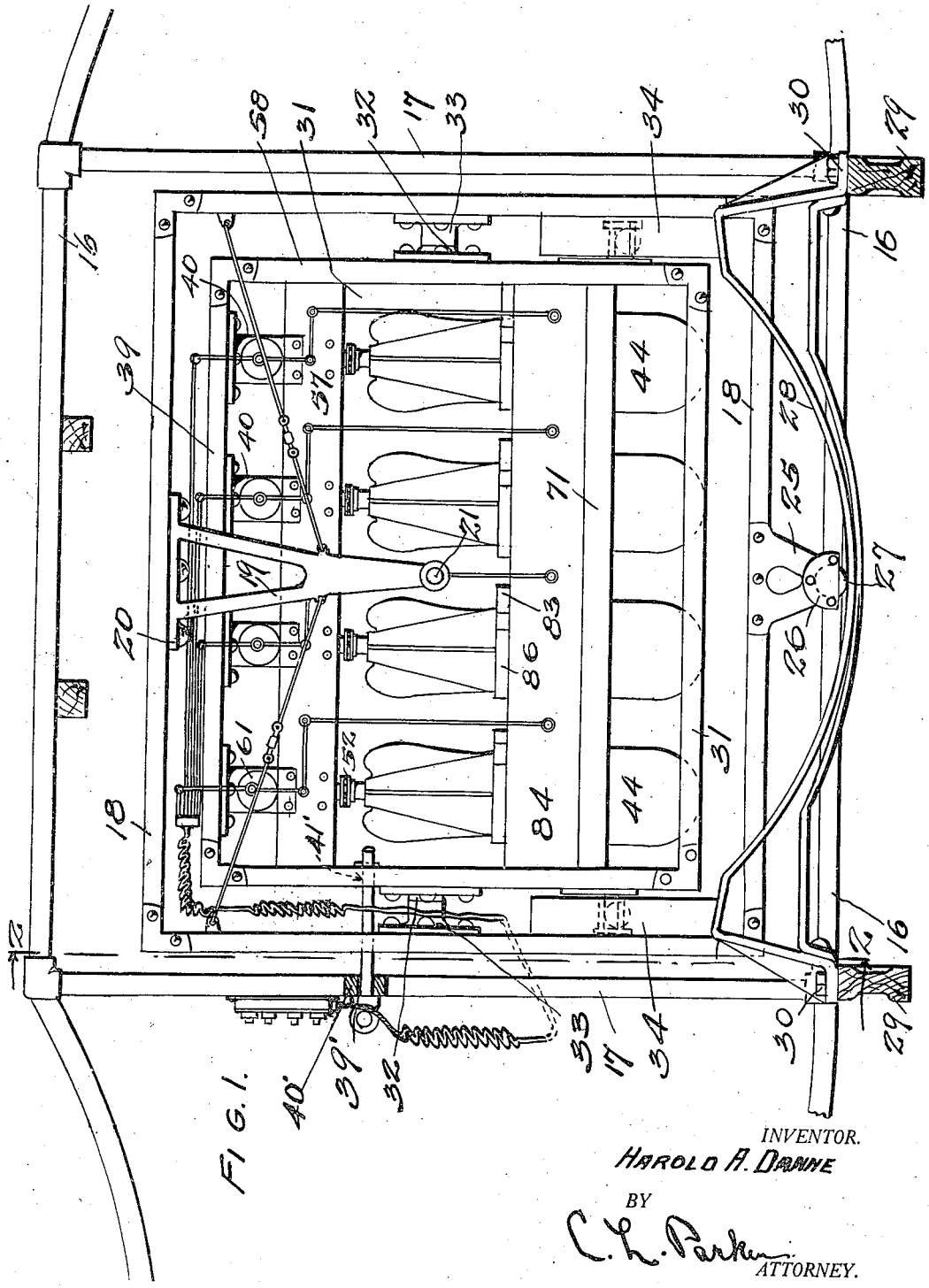

H. A. DANNE.
AIRCRAFT BOMBING APPARATUS.
APPLICATION FILED APR. 14, 1919.

1,383,257.

Patented June 28, 1921.

INVENTOR.
HAROLD A. DANNE
BY
C. L. Parker
ATTORNEY.

H. A. DANNE.
AIRCRAFT BOMBING APPARATUS.
APPLICATION FILED APR. 14, 1919.
1,383,257.
Patented June 28, 1921.
4 SHEETS—SHEET 2.
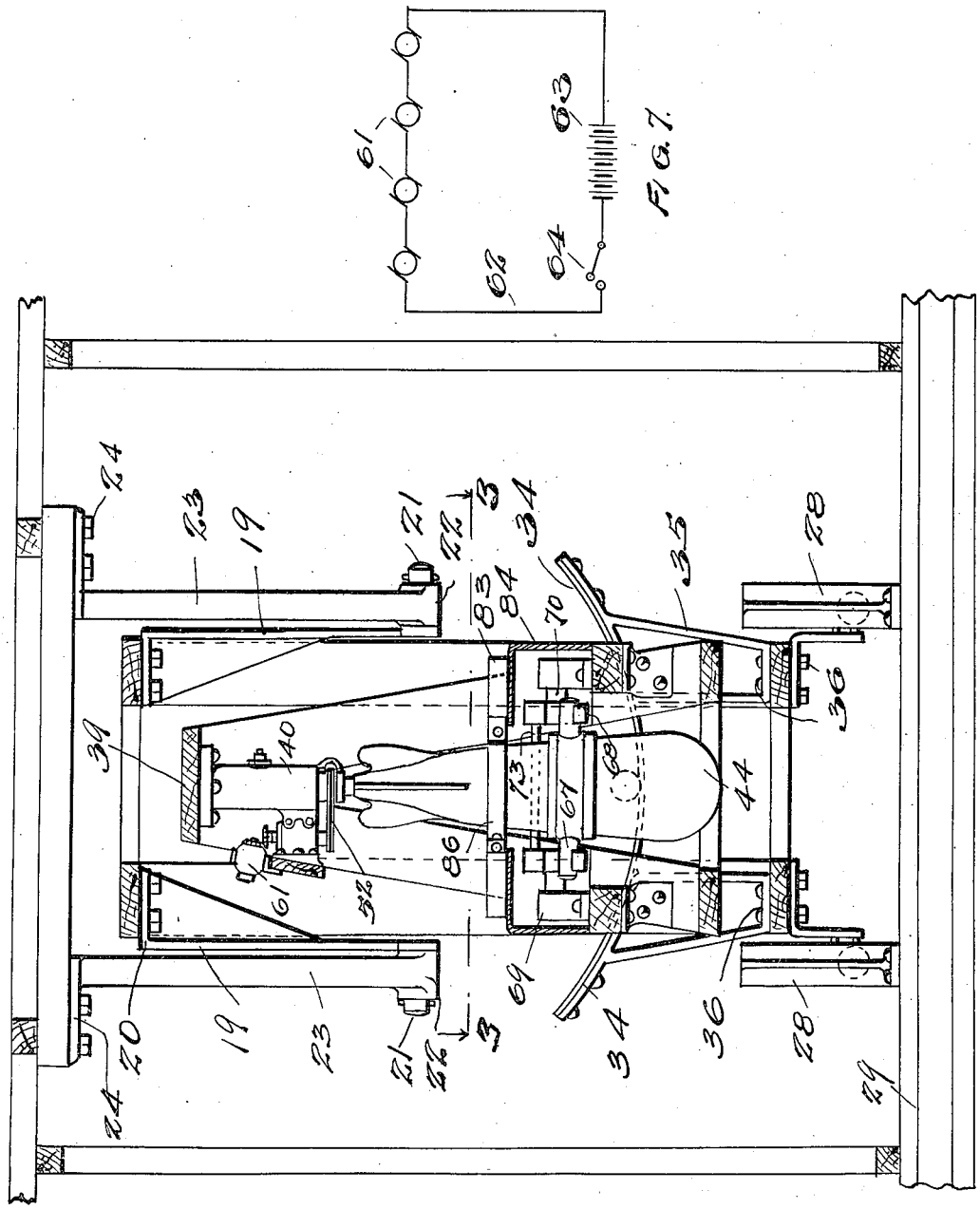
INVENTOR.
HAROLD A. DANNE
BY
C. L. Parker
ATTORNEY.

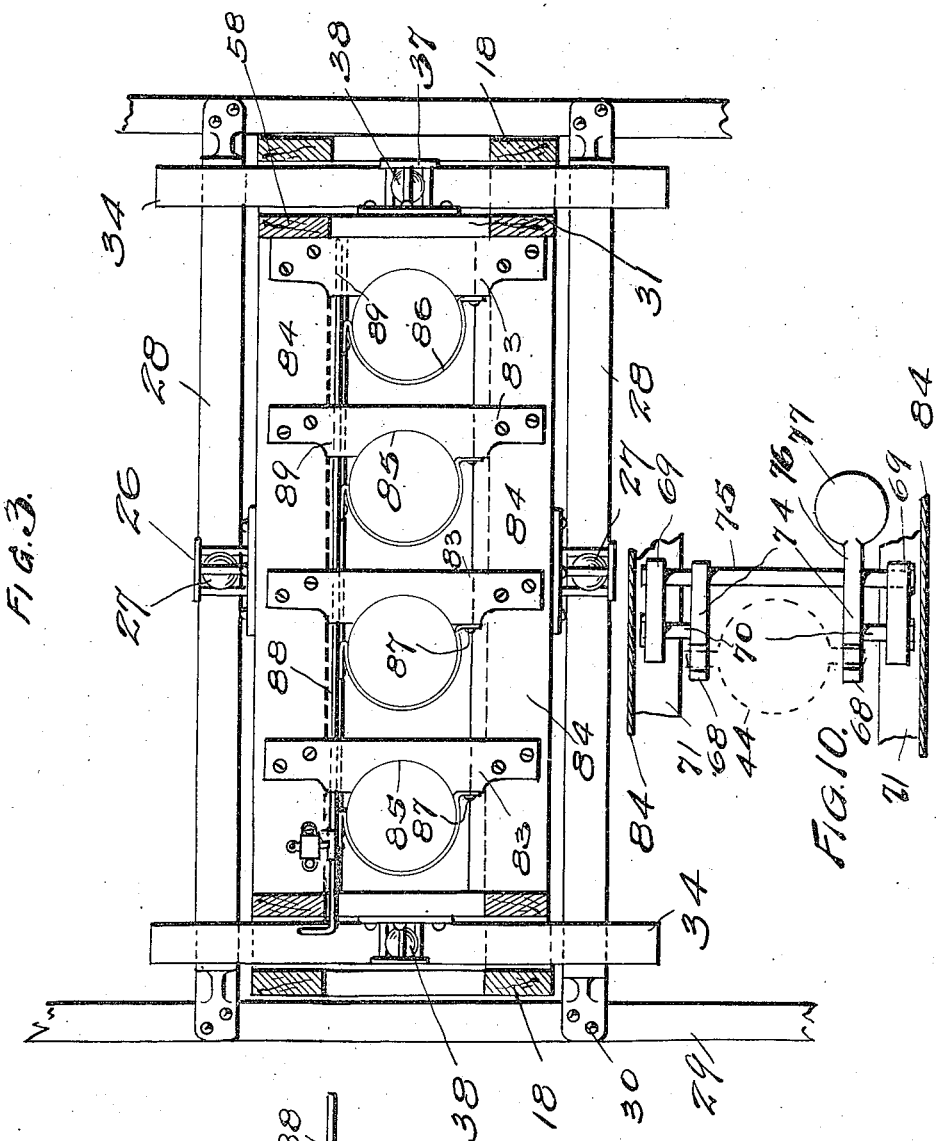

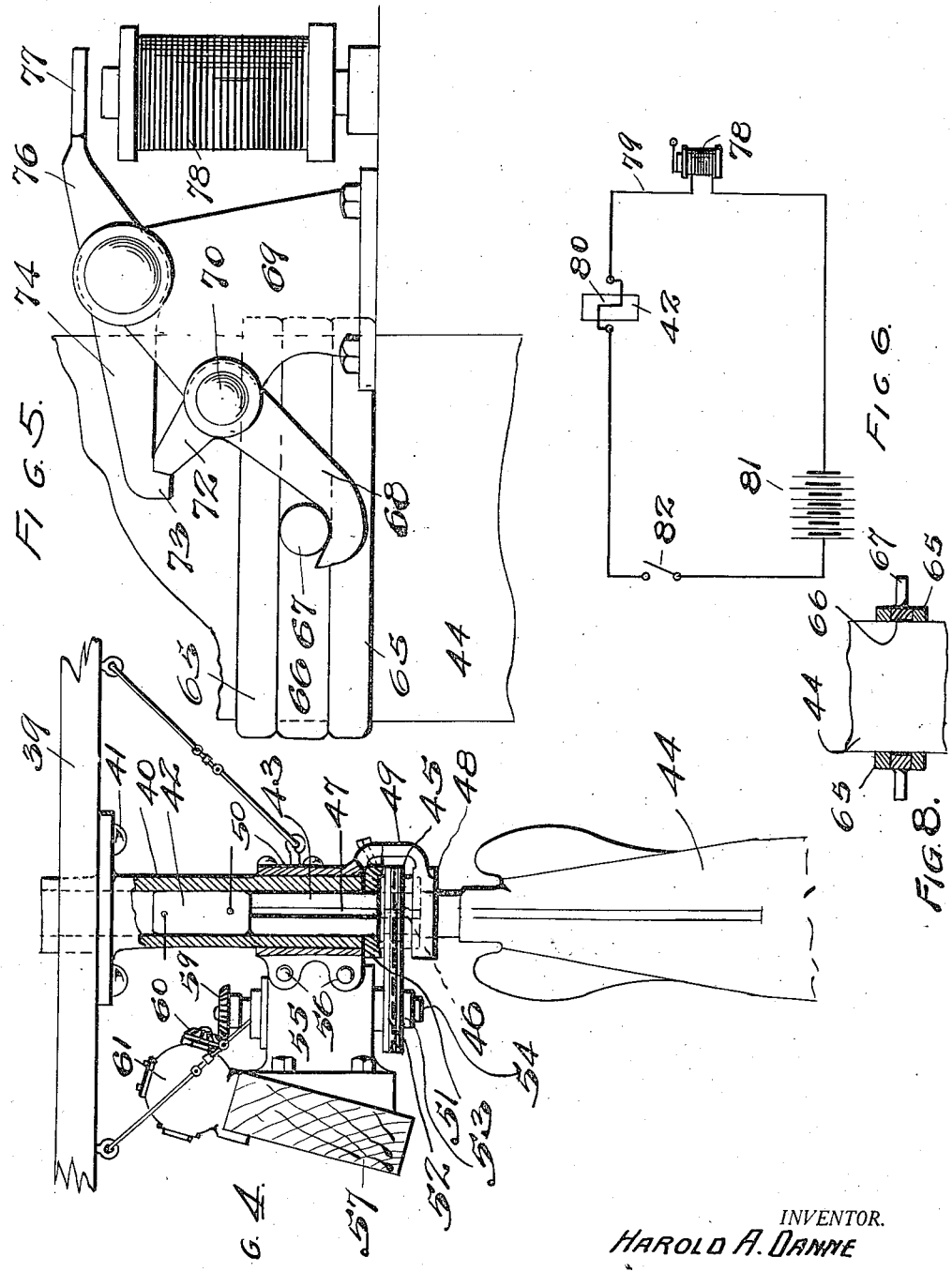

UNITED STATES PATENT OFFICE.

HAROLD A. DANNE, OF NEW YORK, N. Y.

AIRCRAFT BOMBING APPARATUS.

1,383,257.  Specification of Letters Patent.  Patented June 28, 1921.

Application filed April 14, 1919. Serial No. 289,811.

*To all whom it may concern:*

Be it known that I, HAROLD A. DANNE, a citizen of the United States, residing at New York city, in the county of New York and State of New York, have invented certain new and useful Improvements in Aircraft Bombing Apparatus, of which the following is a specification.

My invention relates to apparatus carried by an aeroplane, for discharging bombs.

An important object of the invention is to provide apparatus of the above mentioned character, which will first, maintain the bomb in a vertical position upon discharging the same, second, impart to the bomb upon discharge an initial velocity, and third will impart to the bomb upon discharge a rotary movement.

A further object of the invention is to provide apparatus of the above mentioned character, which is completely under the control of the operator.

A further object of the invention is to provide a gimbal joint structure for supporting the bomb or bombs, whereby they are maintained substantially vertical such gimbal joint structure having means to prevent undue oscillatory movements of the same.

A further object of the invention is to provide apparatus of the above mentioned character which is of comparatively simple construction, and reliable in operation.

Other objects and advantages of the invention will be apparent during the course of the following description.

In the accompanying drawings forming a part of this specification and in which like numerals are employed to designate like parts throughout the same, Figure 1 is a side elevation of apparatus embodying my invention, Fig. 2 is a transverse sectional view taken on line 2—2 of Fig. 1, Fig. 3 is a horizontal sectional view taken on line 3—3 of Fig. 1, Fig. 4 is a side elevation of the means for rotating the bomb, together with associated elements, Fig. 5 is an enlarged side elevation of the means for supporting and releasing the bomb, Fig. 6 is a diagrammatic view of the circuit for firing the cartridge which discharges the bomb and the means which release the bomb upon the discharge of the cartridge, Fig. 7 is a diagrammatic view of the motors and circuit therefor, Fig. 8 is a detailed section through the rotatable band carried by the bomb and associated elements, Fig. 9 is a detail view showing the latch holding the rod operating the means to prevent rotation of the bombs, and Fig. 10 is a detail view showing the bomb supporting and releasing mechanism.

In the drawings, wherein for the purpose of illustration is shown a preferred embodiment of my invention, mounted upon the frame or fuselage of a De Haviland aeroplane, embodying longérons 16, and vertical struts 17, as shown. As the present invention is not concerned with the construction of the aeroplane *per se*, no further detailed description is deemed necessary, it being understood that the apparatus embodying the invention may be applied to other types of aeroplanes, if desired.

I provide a gimbal joint structure, including an outer preferably rectangular frame 18, having brackets 19 secured to the opposite sides thereof, at their tops, as shown at 20, and depending therefrom. These brackets carry trunnions 21, which are pivoted within bearings 22, formed upon depending arms 23, suitably secured to the upper longérons 16, as shown at 24. Particular attention is called to the fact that the pivots or trunnions 21 are arranged on opposite sides of the center of gravity of the outer frame 18, thereby destroying the pendulum effect of the frame. From the foregoing description it will be apparent that the outer frame 18 is adapted to swing in a vertical plane fore and aft of the aeroplane, the same turning upon the lateral axis of the same.

In order that the outer frame 18 may not partake of undue oscillations, I provide means to prevent the same such means comprising brackets 25, attached to the sides of the frame 18, at its bottom. These brackets carry laterally extending cages 26, receiving and holding rolling elements or balls 27, contacting with or traveling upon longitudinally curved tracks 28. These tracks are arranged longitudinally of the frame 18 and are attached to transverse beams 29, as shown at 30. These beams are in turn secured to the lower longérons 16.

The longitudinally curved tracks 28 are concentric with the pivots or trunnions 21. The elements or balls 27 may be of various sizes depending upon the size of the frame 18 and the character of the load carried thereby. These elements or balls are free to rotate within the cages 26, and being acted upon by gravity tend to approach the lowermost point of the tracks 28. This action of these balls tends to stabilize the frame 18, preventing undue oscillation or objectionable pendulum effects. The balls 27 also have sufficient frictional engagement with the cages 26 and tracks 28, to deadbeat the movement of the frame 18, causing the same to stop at the end of its movement without undue oscillation.

Arranged within the frame 18 is an inner frame 31, adapted to swing in a vertical plane, at a right angle to the frame 18. This inner frame is pivotally connected at its ends with the frame 18 by means of trunnions 32, extending into sockets 33, rigidly attached to the frame 18. These trunnions 32 are disposed near the center of gravity of the frame 31.

Arranged at the opposite ends of the inner frame 31 are longitudinally curved tracks 34, carried by brackets 35, secured to the outer frame 18, as shown at 36. As more clearly shown in Fig. 3, cages 37 are attached to the ends of the inner frame 31 and carry elements or balls 38, contacting with the curved tracks 34. The function of the balls 38, cages 37, and tracks 34, is similar to that explained in connection with the balls 27, cages 26, and tracks 28, and need not be again set forth.

I provide means to lock the outer and inner frames 18 and 31 against swinging movement, comprising a bolt 39′, passing through an opening in bar 40′ secured to the vertical struts 17. This bolt also passes through an opening in the side of the frame 18 and a socket 41′, secured to the ends of the inner frame 31.

The inner frame 31 includes a horizontal top member or beam 39, to which is rigidly secured any suitable number of cylinders or barrels 40, by means of bolts 41 or the like. The barrels 40 have their upper and lower ends open, and a duplex cartridge 42 is adapted for insertion within the upper end of the barrel. The lower end of the barrel 40 is adapted for the reception of a cylindrical tail 43 of an aerial bomb or torpedo 44. This tail is loosely mounted within the barrel, is adapted to rotate therein and drop from the same when the bomb is released, as hereinafter described.

In order that a rotary movement may be imparted to the bomb 44, before and at the time of its discharge, I provide a sprocket wheel 45, having a key 46, adapted to slide within a longitudinal groove 47 formed in the tail 43. The sprocket wheel 45 has its lower end slidably mounted within a socket 48, carried by an arm 49 rigidly secured to a sleeve 50, surrounding the barrel 40. A second socket 51 slidably receives the upper end of the sprocket wheel 45 and is rigidly secured to the arm 49, as shown. The sprocket wheel 45 receives its rotation from a sprocket chain 52, engaging a second sprocket wheel 53, rigidly secured to a vertical shaft 54. This shaft is journaled through a bracket 55 having connection with the sleeve 50, as shown at 56. The bracket 55 is bolted to a longitudinal beam 57, secured to the end members 58 of the inner frame. At its upper end, each vertical shaft 54 carries a bevel-gear 59, engaged by a bevel-gear 60, receiving its rotation from a motor 61. I preferably provide a corresponding number of motors and shafts 54 to the number of barrels, and these motors may be connected in series, within a wire 62, as shown in Fig. 7. This wire 62 has a source of current 63 connected therein and a switch 64. When the switch is closed the circuit is completed and all the motors set into operation.

Separate means are provided for rotatably supporting and releasing each bomb 44. Such means include a pair of rings 65, (see Fig. 8), rigidly secured to the bomb 44. Rotatable between the rings 65 is a collar 66 carrying trunnions 67. The trunnions are diametrically oppositely arranged, as shown, at or about the center of gravity of the bomb. The trunnions 67 are supported by dogs 68, pivoted to brackets 69, as shown at 70. These brackets 69 are rigidly secured upon beams 71, arranged within the lower portion of the inner frame, and rigidly secured thereto, as shown in Fig. 2. The dogs 68 are provided at their upper ends with sears or fingers 72, to engage with and beneath sear noses 73, carried by triggers 74. The triggers 74 are rigidly mounted upon a transverse shaft 75, pivotally connected with the upper ends of the brackets 69. One trigger 74 is provided with an extension 76, having an armature 77, formed upon the free end thereof. Arranged beneath the armature 77 is an electro-magnet 78. It is thus seen that when the electro-magnet 78 is energized, the shaft 75 will be turned, and both triggers 74 elevated, so that the sear noses 73 disengage the sears 72, at which time the dogs 68 are free to drop, by virtue of the weight of the bomb, the bomb being thereby released.

The electro-magnet 78 is connected in series with a wire 79. This wire has an electric primer 80 connected in series therewith, the primer being arranged within the duplex cartridge, and consisting of a fine wire adapted to be fused by the current. A source of current 81 is connected in the wire 79 and a switch 82 is also connected in this wire. When the switch 82 is closed, the electro-magnet 78 is energized, and the dogs 68 released, and at about the same time the primer 80 fires the cartridge. This cartridge expels the tail 43 of the bomb from the barrel and imparts to the bomb its initial velocity.

In order that the bombs may be held stationary within the inner frame, prior to their time of discharge, I provide a corresponding number of transverse blocks or members 83, rigidly secured to plates 84, secured to the beams 71. These blocks have recesses 85 formed therein, which receive portions of the bombs 44. Straps 86 of leather or the like, have corresponding ends attached to the blocks 83, as shown at 87, and the opposite corresponding ends of these straps are secured to a reciprocatory lock-rod 88, sliding in openings 89 of the blocks 83. The rod 88 is provided upon one side with a notch 90, to receive a spring catch 91, serving to normally lock the rod against longitudinal movement in one direction. When this rod is slightly turned the catch 91 is removed from the notch 90, and the rod 88 is free to move in the direction of the arrow and will be shifted in that direction by the tension of the straps 86. It is thus seen that when the rod 88 is in the inner position, the straps 86 will firmly bind the bombs 44 to the blocks 83, thus serving in conjunction with the supporting means and associated elements, to securely retain the bombs fixed to the inner frame.

The operation of the apparatus is as follows:

Preparatory to making a flight, the bombs 44 are placed in position within the inner frame 31, their tails 43 projecting into the barrels 40 and the sprocket wheels 45 surrounding portions of the tail, to rotate the same. The trunnions 67 are supported by the dogs 68. The rod 88 is now shifted to the inner position and locked therein, whereby the straps 86 coact with the blocks 88 to hold the bombs fixed or stationary with relation to the inner frame. The cartridges 42 are now inserted within the barrels 40 and the primers 80 connected in series with the wires 79.

The flight is now commenced and when the aeroplane approaches the target and is approximately level, the outer and inner frames 18 and 31 are released, so that they are free to function. The operator next releases the rod 88, the same springing outwardly and releasing the bombs 44, which are now held suspended by the dogs 68. When the target appears in the proper position on the sight, the operator closes the switch 64, thereby causing all of the motors 61 to operate, and revolve all of the bombs. At the instant that the target appears at the proper position in the sight, the switch 82 is closed and the circuit is completed for energizing the electro-magnet 78 and approximately simultaneously actuating the primer 80 to discharge the cartridge 42. The bomb is thus released and at about the same time or an instant after it is released the cartridge 42 is fired. It is thus seen that the bomb is held in a vertical position, by virtue of the gimbal joint structure, at the instant of its discharge, and the bomb is being rotated, before and at the instant of its discharge. The discharge of the bomb is effected by the explosion of the duplex cartridge, which imparts to the bomb its initial velocity.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In apparatus for use upon an air craft, a gimbal joint structure embodying outer and inner frames, a barrel secured to the inner frame and arranged substantially parallel with the vertical axis thereof, an aerial bomb having a tail adapted for insertion within the barrel, means to support the bomb with its tail projected into the barrel and to release the same, and a cartridge adapted for insertion within the barrel, and means for simultaneously releasing said bomb and igniting said charge.

2. In apparatus for use upon a flying machine, a gimbal joint structure embodying outer and inner frames, a barrel secured to the inner frame and arranged substantially parallel with the vertical axis thereof, an aerial bomb having a tail adapted for insertion within the barrel, means to support the bomb with its tail projecting into the barrel and to release the same, a cartridge adapted for insertion within the barrel, and means to rotate the bomb upon its longitudinal axis embodying a sprocket slidably engaging said tail but incapable of rotation thereon, and means for rotating said sprocket.

3. In apparatus for use upon a flying machine, a supporting structure having a portion thereof adapted to maintain a vertical position during the flight of the air craft, a barrel fixed to such portion and adapted to be maintained thereby in a vertical position, an aerial bomb having a tail adapted for insertion within the barrel, means for rotatably supporting the bomb and to release the same, a cartridge adapted for insertion within the barrel, and means to rotate the bomb upon its longitudinal axis.

4. In apparatus for use upon a flying machine, a barrel, means for supporting the barrel and automatically maintaining the same substantially vertical during the flight of the machine, an aerial bomb having a tail adapted for insertion within the barrel, means for rotatably supporting the bomb and releasing the same, a cartridge adapted for insertion within the barrel, and means to rotate the tail of the bomb while within the barrel independently of said barrel.

5. In apparatus for use upon an air craft, a gimbal joint structure embodying inner and outer frames, means for supporting a bomb within the inner frame and releasing the same, means for clamping the bomb within the inner frame to hold the same against movement with relation thereto and to release the bomb when desired, means to rotate the bomb upon its longitudinal axis independently of said barrel, and means to impart to the bomb an initial velocity upon the discharge of the same.

6. In apparatus for use upon an air craft, a gimbal joint structure embodying a pair of frames, a pair of dogs pivoted upon one frame, means to hold the dogs against movement and to release the same, an aerial bomb having an element rotatably secured thereto and provided with trunnions engaging the dogs, a tail secured to the aerial bomb, and means engaging the tail to rotate the same upon its longitudinal axis.

7. In apparatus for use upon a flying machine a fixed barrel, an aerial bomb having a tail adapted for insertion within the barrel, means arranged exteriorly of said barrel for supporting said bomb, means for rotating said bomb, a cartridge adapted for insertion within the barrel and means for simultaneously releasing said bomb supporting means and igniting said cartridge.

In testimony whereof I affix my signature.

HAROLD A. DANNE.